United States Patent
Benisty et al.

(10) Patent No.: US 12,510,922 B2
(45) Date of Patent: Dec. 30, 2025

(54) ADAPTIVE TUNING OF MEMORY DEVICE CLOCK RATES BASED ON USAGE WORKLOADS

(71) Applicant: SANDISK TECHNOLOGIES, INC., Milpitas, CA (US)

(72) Inventors: Shay Benisty, Beer Sheva (IL); Ariel Navon, Revava (IL); Alexander Bazarsky, Holon (IL); Dudy David Avraham, Even Yehuda (IL)

(73) Assignee: Sandisk Technologies, Inc., Milpitas, CA (US)

( * ) Notice: Subject to any disclaimer, the term of this patent is extended or adjusted under 35 U.S.C. 154(b) by 89 days.

(21) Appl. No.: 18/483,488

(22) Filed: Oct. 9, 2023

(65) Prior Publication Data

US 2025/0117037 A1    Apr. 10, 2025

(51) Int. Cl.
| | |
|---|---|
| *G06F 1/00* | (2006.01) |
| *G06F 1/08* | (2006.01) |
| *G06F 1/10* | (2006.01) |
| G06F 1/3203 | (2019.01) |

(52) U.S. Cl.
CPC .................. *G06F 1/08* (2013.01); *G06F 1/10* (2013.01); *G06F 1/3203* (2013.01)

(58) Field of Classification Search
CPC ...................................... G06F 1/08; G06F 1/10
USPC ......................................................... 713/501
See application file for complete search history.

(56) References Cited

U.S. PATENT DOCUMENTS

| | | | |
|---|---|---|---|
| 10,534,546 B2 | 1/2020 | Benisty et al. | |
| 11,460,906 B2 | 10/2022 | Kwon et al. | |
| 11,838,033 B1* | 12/2023 | Benisty | H03M 13/3707 |
| 12,112,048 B2* | 10/2024 | Benisty | G06F 3/0673 |
| 2010/0274933 A1* | 10/2010 | Wang | G06F 3/0634 710/22 |
| 2012/0047318 A1* | 2/2012 | Yoon | G06F 3/0613 711/E12.008 |
| 2014/0097877 A1* | 4/2014 | Baeckler | G06F 1/12 327/158 |
| 2017/0300263 A1* | 10/2017 | Helmick | G06F 3/0679 |
| 2018/0335798 A1* | 11/2018 | Chun | G06F 1/08 |
| 2018/0356996 A1* | 12/2018 | Benisty | G06F 3/0653 |

(Continued)

OTHER PUBLICATIONS

International Search Report and Written Opinion for Application No. PCT/US2024/031420 dated Sep. 6, 2024.

*Primary Examiner* — Volvick Derose
(74) *Attorney, Agent, or Firm* — Patterson + Sheridan, LLP

(57) ABSTRACT

Different operations have different clock rate bottleneck points. For example, during a read operation, the processors may be the bottleneck whereas other operations will not be bottlenecks. Those other operations can have their clock rates reduced to save power since there is no benefit to a higher clock rate as the bottleneck is elsewhere. Predicting the bottleneck would be beneficial. Statistics correlating the bottleneck points with the workload and clock rates are tracked. When the workload changes, the statistics can be consulted to determine where the bottleneck is located and then slow down the clock rates for the non-bottleneck operations. A clock rate table is maintained in the device controller. The table holds the clock rate of each component. Predicting the workload and hence, the clock rates, reduces power consumption, improves performance, and better quality of service (QOS) compatibility characteristics.

19 Claims, 8 Drawing Sheets

(56) References Cited

U.S. PATENT DOCUMENTS

| | | | |
|---|---|---|---|
| 2019/0179547 A1* | 6/2019 | Szubbocsev | G06F 13/4234 |
| 2020/0089404 A1 | 3/2020 | Richter et al. | |
| 2021/0279010 A1 | 9/2021 | Duan et al. | |
| 2022/0147279 A1* | 5/2022 | Goss | G06F 3/0679 |
| 2022/0197524 A1* | 6/2022 | Ruttenberg | G06F 3/0673 |
| 2022/0334769 A1* | 10/2022 | Kim | G06F 3/0634 |
| 2023/0266917 A1 | 8/2023 | Choe et al. | |
| 2024/0069783 A1* | 2/2024 | Roberts | G06F 11/3037 |
| 2024/0094939 A1* | 3/2024 | Pelster | G06F 3/0634 |

* cited by examiner

| WORKLOAD | LIMITED BY | PROCESSORS | DATA-PATH | HOST INTERFACE | NAND TOGGLE MODE | DRAM |
|---|---|---|---|---|---|---|
| MAX FREQUENCY | - | 1200MHz | 800MHz | 1GHz (15GB/Sec) | 3200 | 4266MT/Sec |
| RANDOM READ | PROCESSORS | 1200MHz | 400MHz | 500MHz (7.3GB/Sec) | 2800 | 3200MT/Sec |
| SEQUENTIAL READ | HOST INTERFACE | 600MHz | <800MHz | 1GHz (15GB/Sec) | 2800 | 3200MT/Sec |
| RANDOM WRITE | PROCESSORS | 1200MHz | 400MHz | 250MHz (3.2GB/Sec) | 2800 | 3200MT/Sec |
| SEQUENTIAL WRITE | NAND | 600MHz | 600MHz | 500MHz (7.3GB/Sec) | 3200 | 3200MT/Sec |
| MIXED WORKLOAD | DRAM | 800MHz | 600MHz | 500MHz (7.3GB/Sec) | 3000 | 4266MT/Sec |

FIG. 5

ADAPTIVE TUNING OF MEMORY DEVICE CLOCK RATES BASED ON USAGE WORKLOADS

BACKGROUND OF THE DISCLOSURE

Field of the Disclosure

Embodiments of the present disclosure generally relate to improving adaptive tuning of different clock rates of a memory device.

Description of the Related Art

A storage device comprises different components that may operate at different clock rates. The clock rate is very significant to the overall performance of the system, both in read and write latencies and power consumption. Components are usually synthesized to support the highest possible clock rate, but the clock may be reduced without negative implications. The clock rate of each hardware (HW) element has a direct impact on the performance, power consumption (as well as other metrics) of each component and of the overall system performance. The following elements may have different clock rates, for example: internal processors, data path, host interface, memory device (e.g., NAND) toggle mode, dynamic random access memory (DRAM), and error correction code (ECC) engines.

Clock rates are not adapted, but rather, are typically based on a set table of frequencies that are fixed at the rate defined in the table. Higher clock rates equals higher power usage and, ideally but not always, higher performance. Using a set table leads to the clock rates not being able to change based on the different system environments, which will cause performance issues and latency.

Therefore, there is a need in the art for improving adaptive tuning of different clock rates of a memory device.

SUMMARY OF THE DISCLOSURE

Different operations have different clock rate bottleneck points. For example, during a read operation, the processors may be the bottleneck whereas other operations will not be bottlenecks. Those other operations can have their clock rates reduced to save power since there is no benefit to a higher clock rate as the bottleneck is elsewhere. Predicting the bottleneck would be beneficial. Statistics correlating the bottleneck points with the workload and clock rates are tracked. When the workload changes, the statistics can be consulted to determine where the bottleneck is located and then slow down the clock rates for the non-bottleneck operations. A clock rate table is maintained in the device controller. The table holds the clock rate of each component. Predicting the workload and hence, the clock rates, reduces power consumption, improves performance, and better quality of service (QoS) compatibility characteristics.

In one embodiment, a data storage device comprises: a memory device; and a controller coupled to the memory device, wherein the controller is configured to: data storage device, comprising: a memory device; and a controller coupled to the memory device, wherein the controller is configured to: determine a workload for the data storage device; determine a bottleneck element for the workload; select a clock rate for the bottleneck element to a maximum clock rate of the bottleneck element; and select a clock rate for elements other than the bottleneck element to below a maximum clock frequency of respective elements.

In another embodiment, a data storage device comprises: a memory device; and a controller coupled to the memory device, wherein the controller is configured to: classify a current workload of the data storage device; determine that the current workload is going to switch to a new workload; and select clock rates based upon the new workload from a stored table.

In another embodiment, a data storage device comprises: means to store data; and a controller coupled to the means to store data, wherein the controller is configured to: determine that a workload of the data storage device is one of: random read, sequential read, random write, sequential write, and mixed workload; obtain clock rates from a table corresponding to the workload; and set clock rates for a plurality of components of the data storage device, wherein the set clock rates are the obtained clock rates.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 is a table indicating clock allocation per workload according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specific described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Different operations have different clock rate bottleneck points. For example, during a read operation, the processors may be the bottleneck whereas other operations will not be bottlenecks. Those other operations can have their clock rates reduced to save power since there is no benefit to a higher clock rate as the bottleneck is elsewhere. Predicting the bottleneck would be beneficial. Statistics correlating the bottleneck points with the workload and clock rates are tracked. When the workload changes, the statistics can be consulted to determine where the bottleneck is located and then slow down the clock rates for the non-bottleneck operations. A clock rate table is maintained in the device controller. The table holds the clock rate of each component. Predicting the workload and hence, the clock rates, reduces power consumption, improves performance, and better quality of service (QoS) compatibility characteristics.

Figure 1:
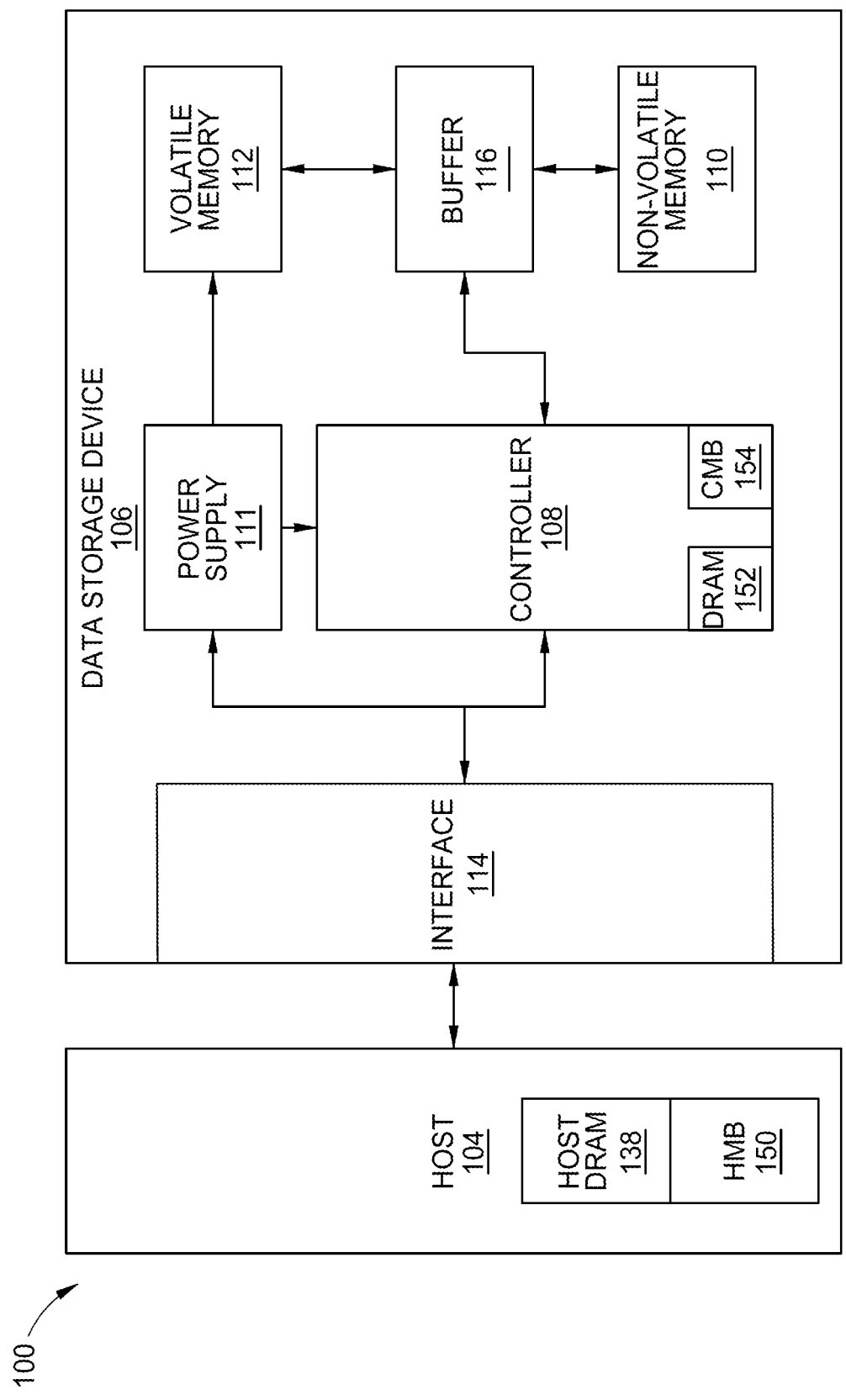
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138 and, optionally, a host memory buffer (HMB) 150. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. The controller 108 may include volatile memory such as DRAM 152 as well as a controller memory buffer (CMB) 154 dedicated for host device 104 usage. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

As will be discussed below, the disclosure involves an adaptive tuning of the different clock rates of a data storage device based on prediction based classification of a current workload to one or more predefined workload classes. The disclosure involves a tradeoff between power and performance. The logic predicts when performance is required and adapts the clock rates accordingly. When performance is not required, the clock rates can be slowed down to save power consumption.

The disclosure involves an offline stage and an online stage. For the offline stage, several combinations of system clock values are defined according to workload classification. The online stage involves classifying current workloads to one of the predefined classes and setting the system clocks to the specific predefined values of the predicted class. The clock rate table (or clock frequency table) is maintained in the controller. The table holds the clock frequency (or rate) of each component per workload. The controller predicts the next workload class and selects the clock frequencies (or rate) accordingly. The terms clock rate and clock frequency are used interchangeably throughout the disclosure.

The preliminary offline analysis will include defining several workload types, with distinct characteristics. For example, the following workload types could be defined as distinct classes: random read workload, sequential read workload, random write workload, sequential write workload, mixed workload, and low queue depth workload. A mixed workload is a workload at which a percentage (e.g., 70 percent) of commands are random and another percentage (e.g., 30 percent) of commands are sequential. It is to be understood that the 70/30 percentage is merely an example as other percentages are contemplated. Each of the workload types includes main characteristics from the system point of view, including system elements bottlenecks, etc. For example, a sequential write workload may be gated by the memory device (e.g., NAND) write speed while the sequential write workload may be gated by the interfaces such as the flash interface module (FIM) and/or the host interface module (HIM). Balancing the clocks that don't gate the system reduces the peak power events.

For example, for a low queue depth workload, all clock rates are maxed because the queue needs to be serviced so regularly that there really is no opportunity for power saving, but for random read workloads, the processors may be the bottleneck. For sequential reads workloads, the HIM and/or FIM may be the bottleneck. For random write workloads, the processors may again be the bottleneck, while for sequential writes the memory device (e.g., NAND) may be the bottleneck. For mixed workloads, the DRAM may be the bottleneck. It is important to note that the bottlenecks per workload identified herein are merely examples and not limiting of the disclosure. For example, for mixed workloads, DRAM is identified as the bottleneck, but it is to be understood that other components may be the bottleneck. Additionally, it is contemplated that multiple components may equally be bottlenecks depending upon workload and individual data storage device idiosyncrasies.

Each workload class may be characterized by a series of features that allows quick identification of the workload. In addition to the trivial features, such as the average command size and the power of read/write/idle commands, simple features can be added that may help produce fast classification of the workload type. Such example extra features may include the following: command length diversity level, averaged or standard deviation (STD) of logical block address (LBA) between adjacent commands, average number or STD of consequent write/read commands, and queue depth.

Figure 2:
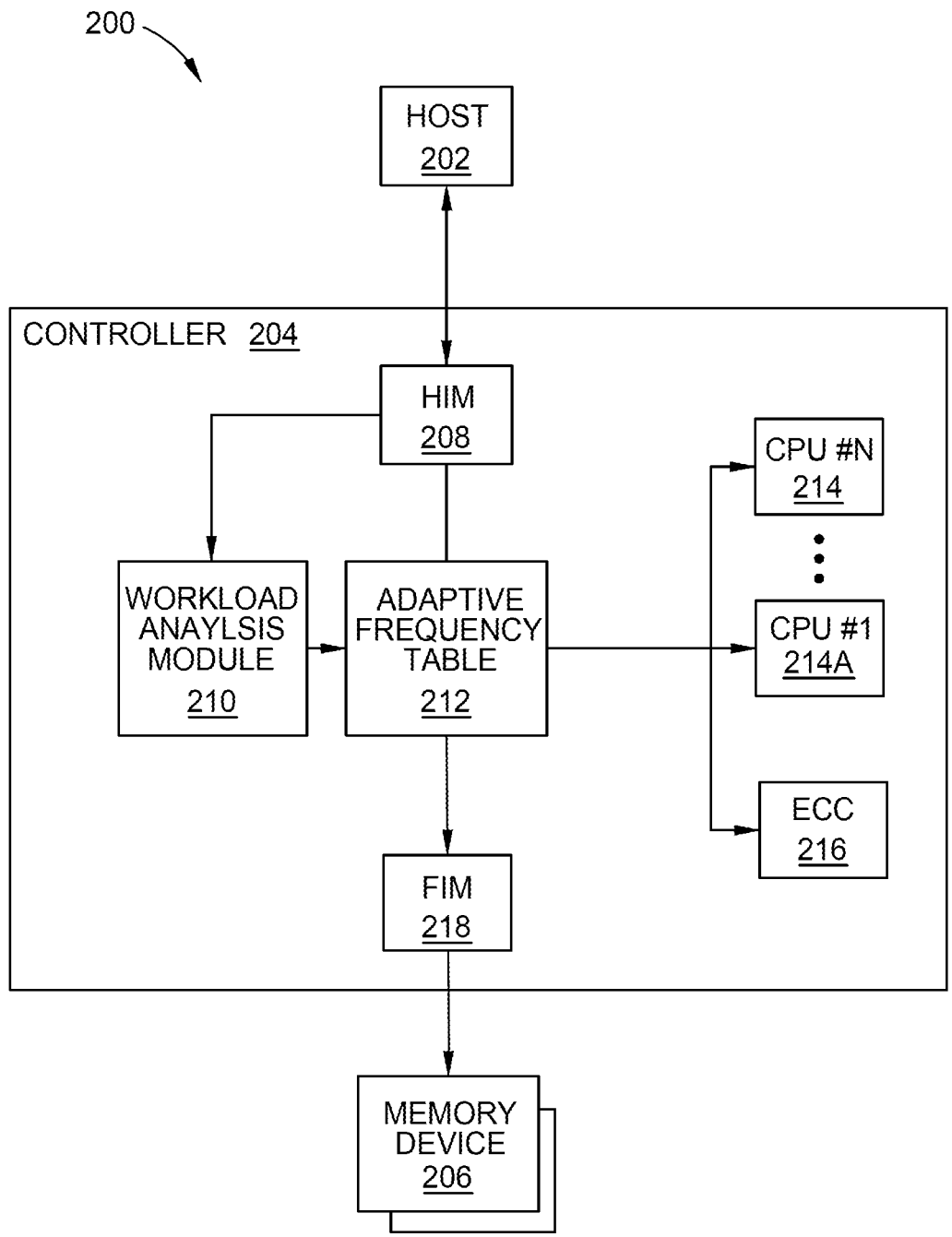
FIG. 2 is a schematic block diagram illustrating a storage system according to one embodiment.

FIG. 2 is a schematic block diagram illustrating a storage system 200 according to one embodiment. The storage system 200 includes a host device 202, a controller 204, and one or more memory devices 206. The controller includes a HIM 208, a FIM 218, a workload analysis module 210 that receives input from the HIM 208, and an adaptive frequency table 212 that receives input from the workload analysis module. The adaptive frequency table 212 outputs to the HIM 208, the FIM 218, an error correction code (ECC) module 216, and one or more processors 214A-214N. The FIM is coupled to the memory device 206, and the HIM 208 is coupled to the host device 202. The workload analysis module 210 receives inputs from the HIM 208 with the features mentioned above. Then, the adaptive frequency table 212 receives an indication of workload class change and supplies frequencies (or rates) to all the system components from a predefined set of tables.

The online stage is a dynamic inference stage that includes performing multiple steps. One step is tracking values of the predefined features by sampling the features at a predetermined interval (e.g., one in 1 second). Another step is operating simple inference prediction mechanisms based on a model defined offline with a goal of the classification of the current workload into one of several predefined workload types. Another step is in case of identification of a change of current workload type to modify the different system clocks accordingly. The adaptation of the system clocks can be maneuvered by the operating firmware (FW) or be conditioned by a minimal distance identification within the measured features such that the clock's reconfiguration will be initiated only upon a major change of the workload type. Another step is to monitor the impact of the clocks' change and feedback the effectivity of the proposed adaptive mechanism such that it can be skipped off in times of minimal/negative impact on the system performance/power management.

Figure 3:
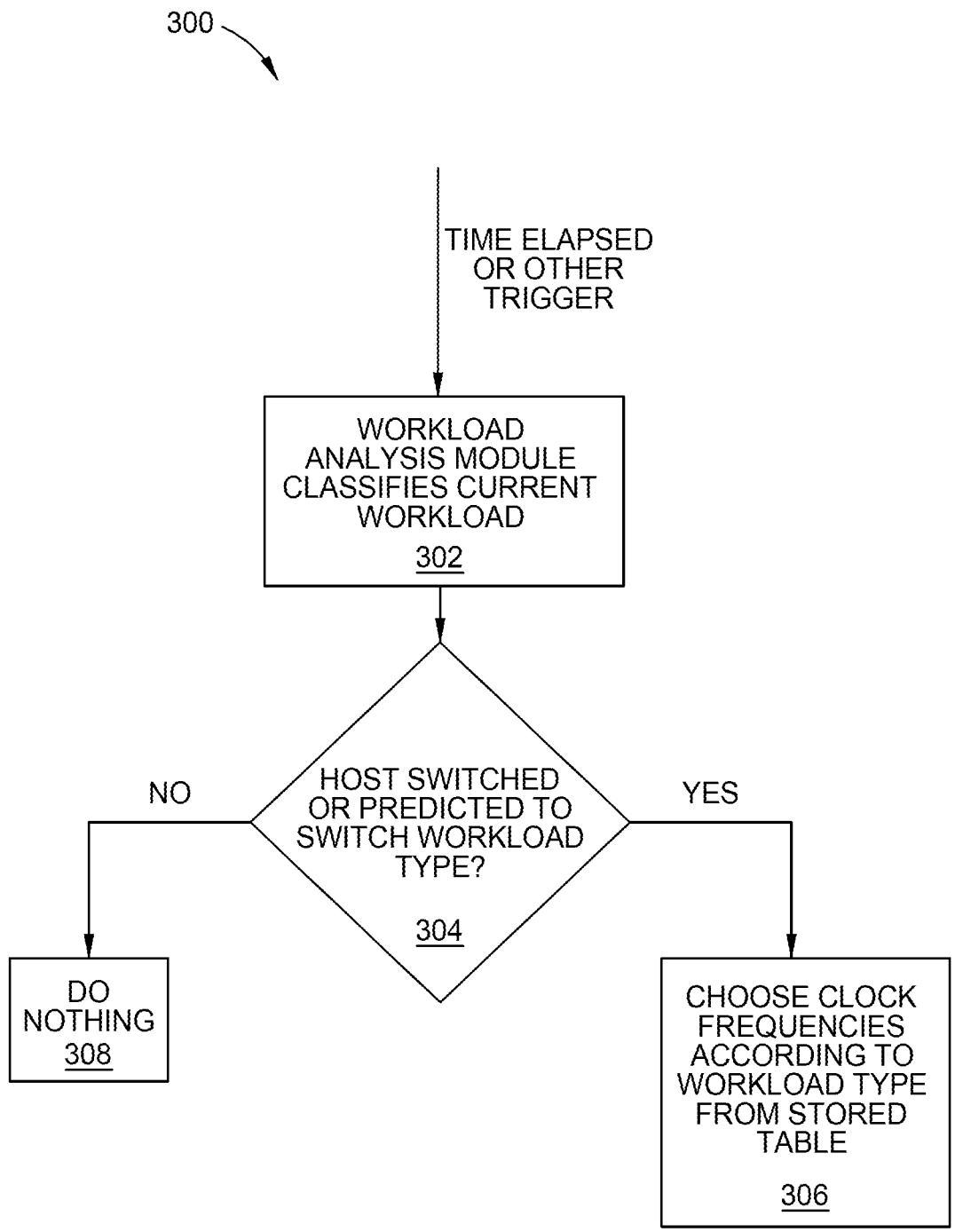
FIG. 3 is a flowchart illustrating clock management according to one embodiment.

FIG. 3 is a flowchart 300 illustrating clock management according to one embodiment. The method involves the workload analysis module classifying the current workload at 302 after a predetermined time has elapsed or some other trigger has occurred. Thereafter, a determination is made regarding whether the host switched or if the host is predicted to switch the workload type at 304. If there has not been a switch or there is no predicted to be a switch, then at 308 nothing is done, but if there is a switch that has either happened or is predicted to happen, then at 306 the clock frequencies are chosen according to workload type from a stored table.

In one example, the clock rates can be chosen based on doorbell rates. In the example, the prediction of the coming workload is based on doorbell rates. The doorbell is a message sent by the host to tell the data storage device that new commands are queued in one of the submission queues (SQs). The controller measures the rates of those messages while taking into account the number of new available commands in each doorbell and the average command size per SQ. Based on the information, the controller classifies the current workload and along with the predicted pending transfer size, clock frequencies are selected.

Figure 4:
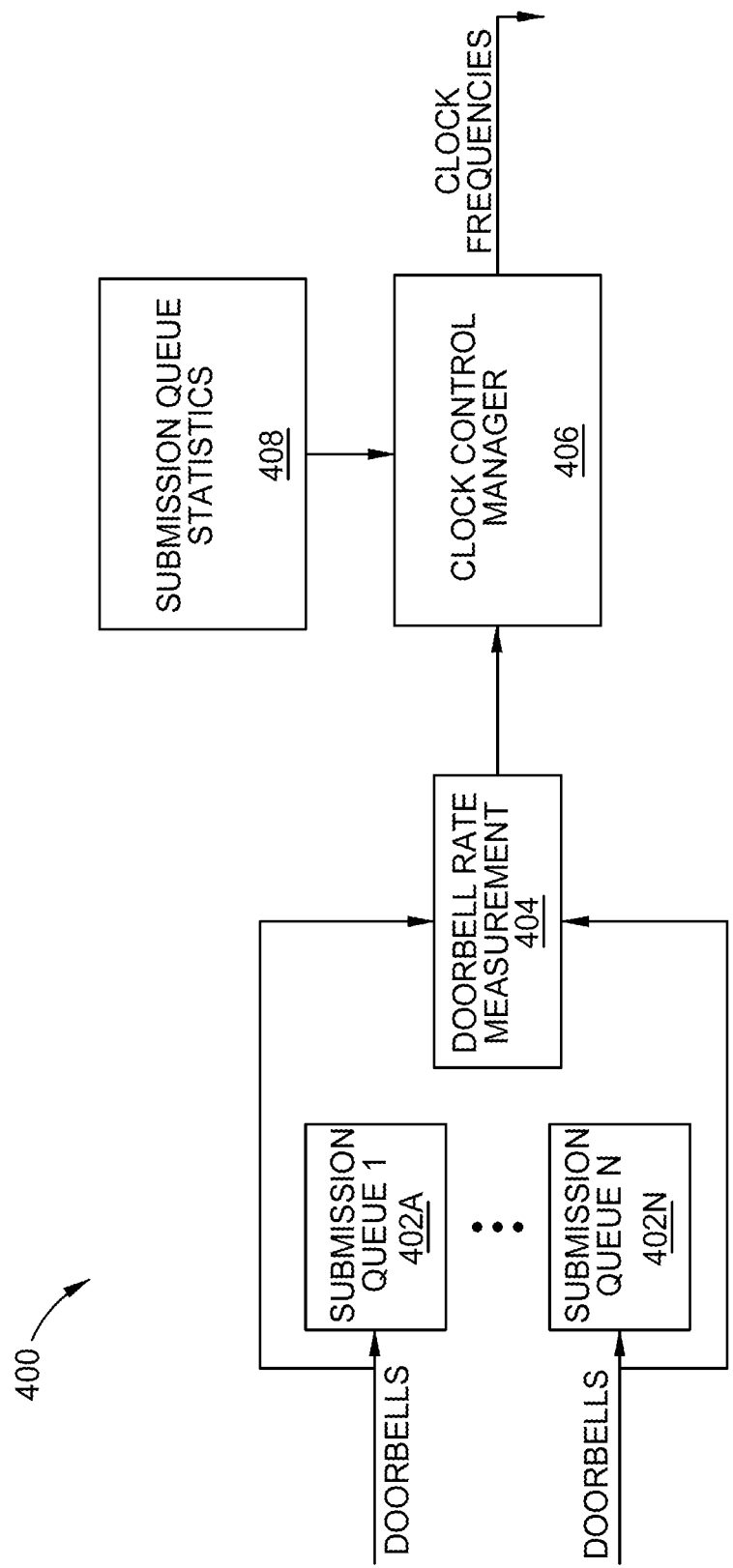
FIG. 4 is a schematic illustration of a correlation between doorbell rates and clock frequencies according to one embodiment.

FIG. 4 is a schematic illustration 400 of a correlation between doorbell rates and clock frequencies according to one embodiment. Multiple SQs 402A-402N have doorbells, and a doorbell rate measurement module 404 measures the rates of the doorbells for the respective SQs, and collectively. The doorbell rate measurement module 404 feeds results into a clock control manager 406. The clock control manager 406 also receives input of SQ statistics 408 and outputs clock frequencies to utilize. The SQ statistics may include the command type for each SQ along with the average size of the command. For example, SQ1 402A may have an average command size of 4 KB for read commands, but an average command size of 16 KB for write commands. SQN may have an average command size of 16 for read commands, but an average command size of 32 KB for copy commands. Using a simple prediction mechanism (i.e., just the average command size if unknown), the controller manages the clock frequencies adaptively and ahead of time as the clock frequencies are a function of doorbell messages which is early enough before the traffic is available. It is both the rate of the doorbells and the average size of that doorbell command that predicts what would be the next workload.

FIG. 5 is a table indicating clock allocation per workload according to one embodiment. In the embodiment of FIG. 5, different clock rates are adapted for each typical workload. An example to clock allocation per workload appears in the table in accordance with the characteristics of each workload. It is to be understood that the clock rates identified are merely for exemplification purposes only and not to be limiting of the disclosure.

For example, for a maximum frequency workload, there is no limiting bottleneck. In the maximum frequency workload, then processors operate at a clock rate of 1200 MHz, the data path operates at a clock rate of 800 MHZ, the HIM operates at a clock rate of 1 GHz (i.e., 15 GB/sec), the memory device (e.g., NAND) toggle mode operates at a clock rate of 3200, and the DRAM operates at a clock rate of 4266 MT/sec. As there is no bottleneck component, no clock rates are reduced, and each component operates at a maximum clock rate.

For a random read workload, the processors are the limiting bottleneck. As such, the processors, even when operating at their maximum clock rate, limit system performance. Therefore, operating the other components at their respective maximum clock rates would utilize unnecessary power without a corresponding increase in performance and/or QoS. In the random read workload, the processors operate at a their maximum clock rate of 1200 MHz, while the data path, HIM, memory device toggle mode, and DRAM clock rates are all reduced below their respective maximum clock rates. Specifically, the data path operates at a clock rate of 400 MHz, the HIM operates at a clock rate of 500 MHz (i.e., 7.3 GB/sec), the memory device (e.g., NAND) toggle mode operates at a clock rate of 2800, and the DRAM operates at a clock rate of 3200 MT/sec.

For a sequential read workload, the HIM is the limiting bottleneck. As such, the HIM, even when operating at its maximum clock rate, limits system performance. Therefore, operating the other components at their respective maximum clock rates would utilize unnecessary power without a corresponding increase in performance and/or QoS. In the sequential read workload, the HIM operates at its maximum clock rate of 1 GHz (15 GB/sec), while the data path, processors, memory device toggle mode, and DRAM clock rates are all reduced below their respective maximum clock rates. Specifically, the data path operates at a clock rate of less than 800 MHz, the processors operate at a clock rate of 600 MHz, the memory device (e.g., NAND) toggle mode operates at a clock rate of 2800, and the DRAM operates at a clock rate of 3200 MT/sec.

For a random write workload, the processors are the limiting bottleneck. As such, the processors, even when operating at their maximum clock rate, limit system performance. Therefore, operating the other components at their respective maximum clock rates would utilize unnecessary power without a corresponding increase in performance and/or QoS. In the random write workload, the processors operate at a their maximum clock rate of 1200 MHz, while the data path, HIM, memory device toggle mode, and DRAM clock rates are all reduced below their respective maximum clock rates. Specifically, the data path operates at a clock rate of 400 MHz, the HIM operates at a clock rate of 250 MHz (i.e., 3.2 GB/sec), the memory device (e.g., NAND) toggle mode operates at a clock rate of 2800, and the DRAM operates at a clock rate of 3200 MT/sec.

For a sequential write workload, the memory device is the limiting bottleneck. As such, the memory device, even when operating at its maximum clock rate, limits system performance. Therefore, operating the other components at their respective maximum clock rates would utilize unnecessary power without a corresponding increase in performance and/or QoS. In the sequential write workload, the memory device operates at a its maximum clock rate of 3200, while the data path, HIM, processors, and DRAM clock rates are all reduced below their respective maximum clock rates. Specifically, the data path operates at a clock rate of 600 MHz, the HIM operates at a clock rate of 500 MHz (i.e., 7.3 GB/sec), the processors operate at a clock rate of 600 MHz, and the DRAM operates at a clock rate of 3200 MT/sec.

For a mixed workload, the DRAM is the limiting bottleneck. As such, the DRAM, even when operating at its maximum clock rate, limits system performance. Therefore, operating the other components at their respective maximum clock rates would utilize unnecessary power without a corresponding increase in performance and/or QoS. In the mixed workload, the DRAM operates at its maximum clock rate of 4266 MT/sec, while the data path, HIM, memory device toggle mode, and processor clock rates are all reduced below their respective maximum clock rates. Specifically, the data path operates at a clock rate of 600 MHz, the HIM operates at a clock rate of 500 MHZ (i.e., 7.3 GB/sec), the memory device (e.g., NAND) toggle mode operates at a clock rate of 3000, and the processor operates at a clock rate of 800 MHz.

In each case of the table, the bottleneck operates at the maximum clock rate while the other components operate at less than their respective clock rates. The amount below the respective maximum clock rates can be chosen to be a value that is below the maximum clock rate, yet above a clock rate that would cause the other component to become a bottleneck.

Figure 6:
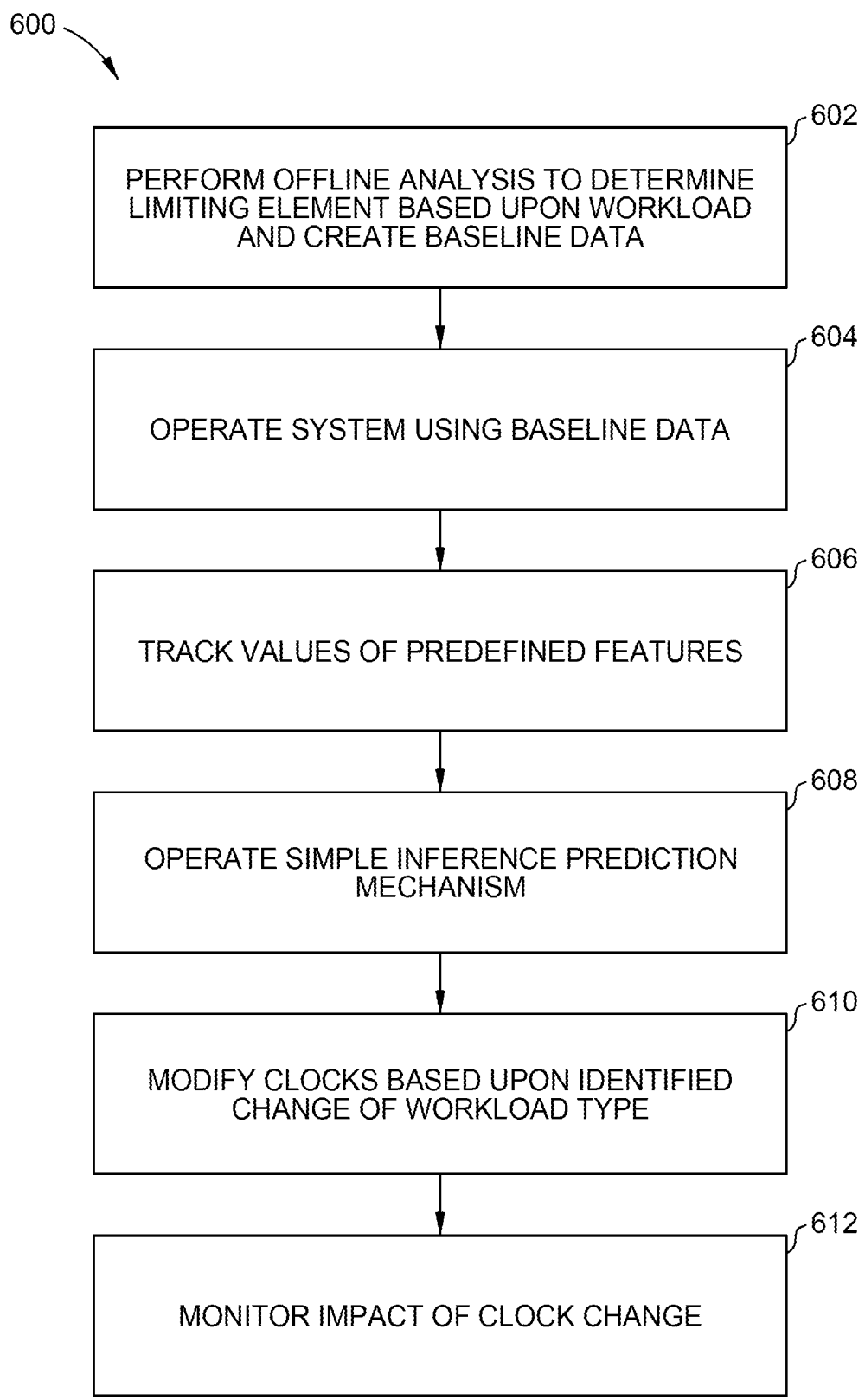
FIG. 6 is a flow chart illustrating clock frequency management according to one embodiment.

FIG. 6 is a flow chart 600 illustrating clock frequency management according to one embodiment. The method of FIG. 6 involves performing an offline analysis to determine the limiting element (i.e., bottleneck) based upon workload. The controller thus creates baseline data at 602. The system then operates using the baseline data at 604 and tracks the values of predefined features (i.e., the elements of the system having clock rates) at 606. The controller operates a simple inference prediction mechanism at 608 and modifies clock rates based upon identified changes in workload type at 610. The controller monitors any impact of the clock rate changes at 612.

Figure 7:
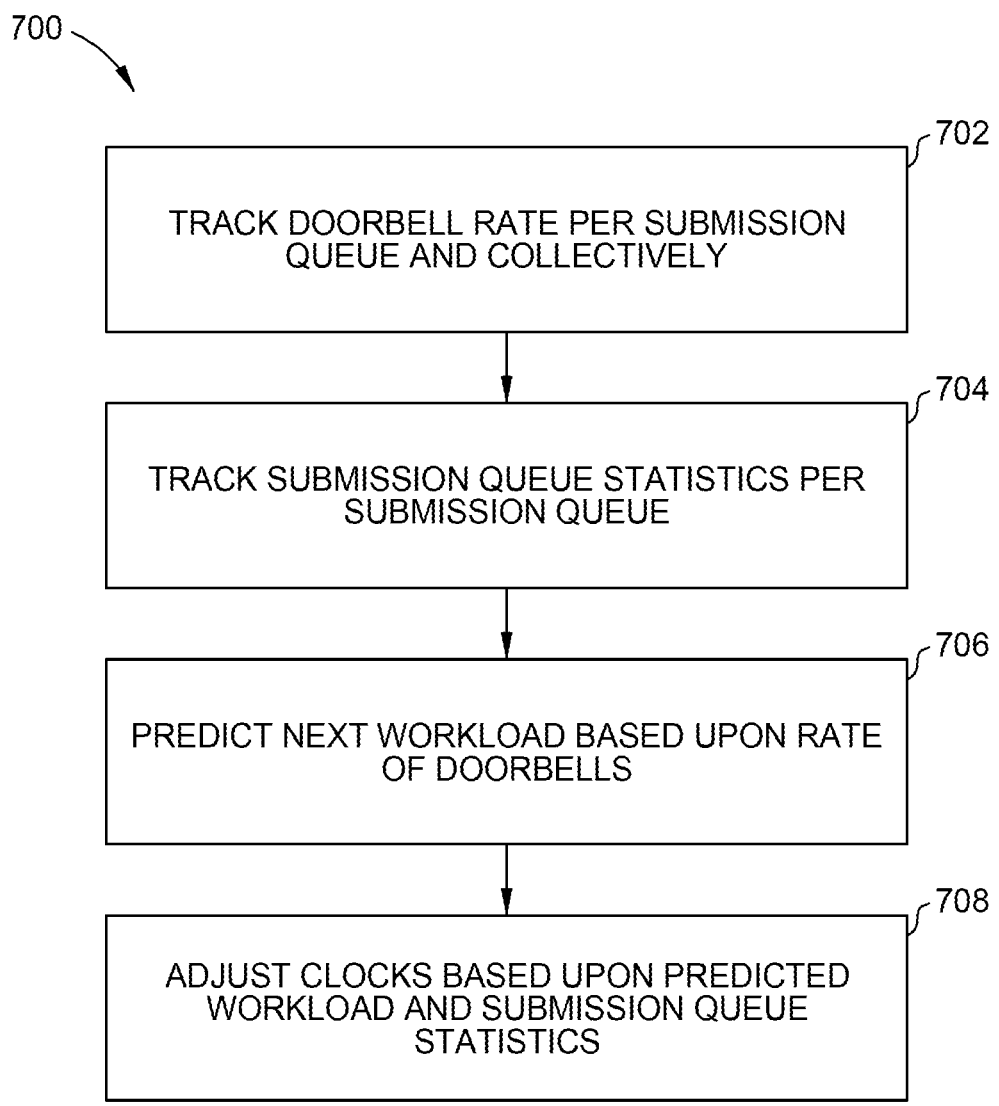
FIG. 7 is a flow chart illustrating doorbell frequency tracking according to one embodiment.

FIG. 7 is a flow chart 700 illustrating doorbell frequency tracking according to one embodiment. The method of FIG. 7 involves tracking the doorbell rate for each SQ both individually and collectively at 702. The SQ statistics are also tracked per SQ at 704. Blocks 702 and 704 can be performed in any order. The controller predicts the next workload based upon the rate of the doorbells at 706, and adjusts cock rates based upon the predicted workload and SQ statistics at 708.

Figure 8:
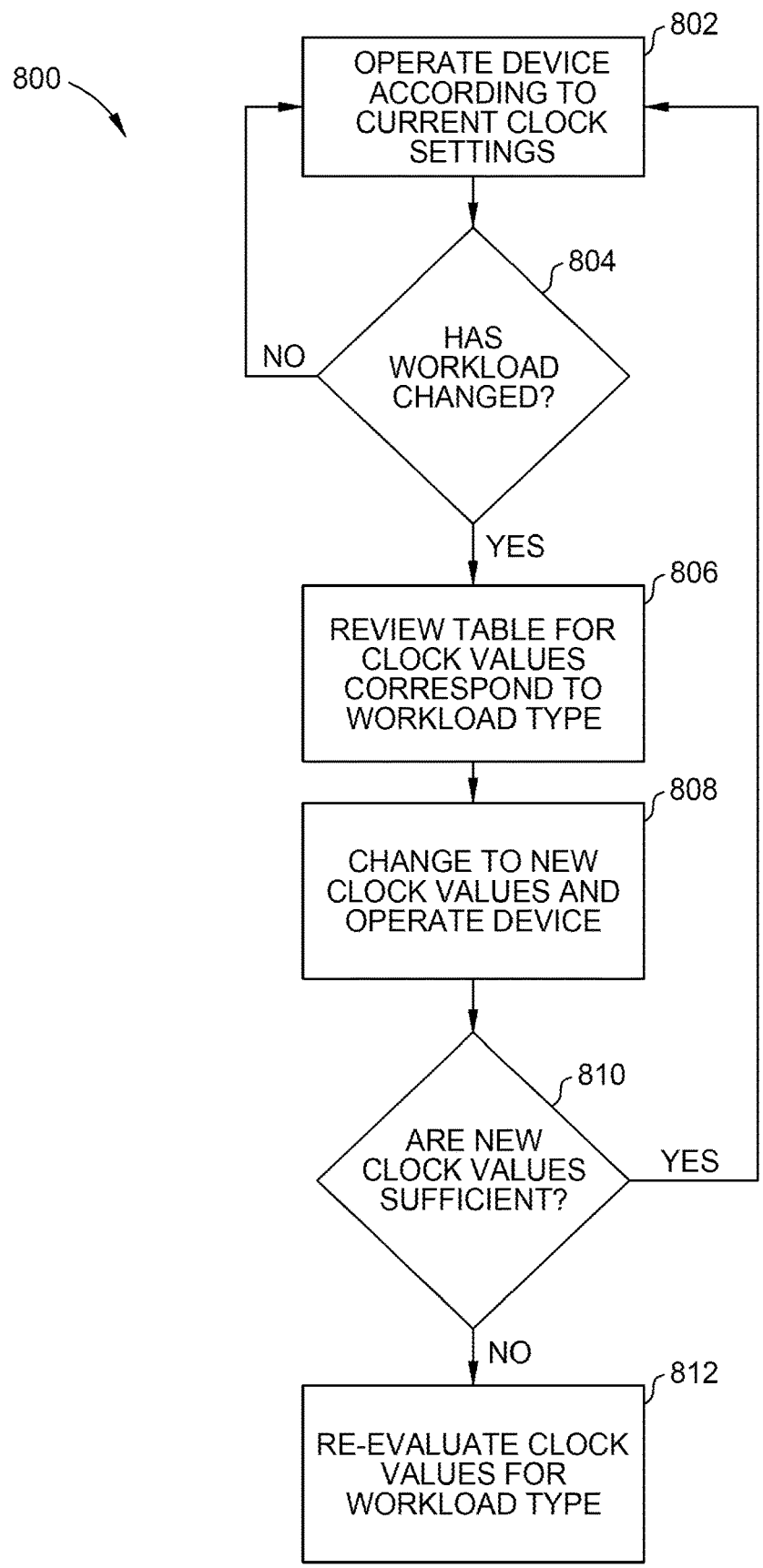
FIG. 8 is a flow chart illustrating clock frequency management according to another embodiment.

FIG. 8 is a flow chart 800 illustrating clock frequency management according to another embodiment. The method of FIG. 8 involves operating the data storage device according to the current clock rate setting at 802. A determination is made at 804 regarding whether the workload has changed. If the workload has not changed, the method returns to 802. If the workload has changed, then the controller reviews a table for clock rate values corresponding to the new workload at 806. The controller then changes the clock rates to new clock rates from the table and operates the data storage device at the new clock rates at 808. The controller then determines whether the new clock rates are sufficient at 810. If the new clock rates are sufficient, then the method returns to 802, but if the new clock rates are insufficient, the controller re-evaluates the clock rates for the workload type at 812 and may initiate a retraining to update the table offline or simply update the table dynamically.

By maximizing the clock rate of a bottleneck component and reducing clock rate for non-bottleneck components, a more flexible system design is able to adapt according to the workload. Such a system reduces peak power consumption, improves performance, and provides better QoS compatibility characteristics.

In one embodiment, a data storage device comprises: a memory device; and a controller coupled to the memory device, wherein the controller is configured to: data storage device, comprising: a memory device; and a controller coupled to the memory device, wherein the controller is configured to: determine a workload for the data storage device; determine a bottleneck element for the workload; select a clock rate for the bottleneck element to a maximum clock rate of the bottleneck element; and select a clock rate for elements other than the bottleneck element to below a maximum clock frequency of respective elements. The controller is configured to define multiple combinations of clock rates for the respective elements and the bottleneck element. The controller is configured to maintain a clock rate table. The controller is configured to define distinct classes of workloads. The distinct classes are selected from the group consisting of random read, sequential read, random write, sequential write, mixed workload, and low queue depth. The distinct classes are characterized by average command size, portion of read commands, write commands, and idle time. The distinct classes are characterized by command length diversity level, average or standard deviation (STD) of logical block address (LBA) distance between adjacent commands, average number or STD of consequent write/read commands, and queue depth. The controller includes a workload analysis module and an adaptive frequency table. The controller is configured to detect a change in workload. The controller is configured to monitor impact of clock rate changes. The clock rates are based on doorbell rates. The clock rates are additionally based on submission queue statistics maintained by the controller.

In another embodiment, a data storage device comprises: a memory device; and a controller coupled to the memory device, wherein the controller is configured to: classify a current workload of the data storage device; determine that the current workload is going to switch to a new workload; and select clock rates based upon the new workload from a stored table. The determining is based upon a rate that a doorbell is rung. The controller is configured to track the rate that the doorbell is rung. The controller is configured to track a number of new available commands in each doorbell and an average command size per submission queue. The controller is configured to predict a pending transfer size for a command in the new workload.

In another embodiment, a data storage device comprises: means to store data; and a controller coupled to the means to store data, wherein the controller is configured to: determine that a workload of the data storage device is one of: random read, sequential read, random write, sequential write, and mixed workload; obtain clock rates from a table corresponding to the workload; and set clock rates for a plurality of components of the data storage device, wherein the set clock rates are the obtained clock rates. A clock rate for processors is different from a clock rate for a host interface. Different workloads have different clock rates for one or more components of the plurality of components.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, wherein the controller is configured to:
define distinct classes of workloads, wherein the distinct classes are characterized by command length diversity level, average or standard deviation (STD) of logical block address (LBA) distance between adjacent commands, average number or STD of consequent write/read commands, and queue depth;
determine a workload for the data storage device;
determine a bottleneck element for the workload;
select a clock rate for the bottleneck element to a maximum clock rate of the bottleneck element; and
select a clock rate for elements other than the bottleneck element to below a maximum clock frequency of the respective elements.

2. The data storage device of claim 1, wherein the controller is configured to define multiple combinations of clock rates for the respective elements and the bottleneck element.

3. The data storage device of claim 1, wherein the controller is configured to maintain a clock rate table.

4. The data storage device of claim 1, wherein the controller is configured to define distinct classes of workloads.

5. The data storage device of claim 4, wherein the distinct classes are selected from the group consisting of random read, sequential read, random write, sequential write, mixed workload, and low queue depth.

6. The data storage device of claim 5, wherein the distinct classes are characterized by average command size, portion of read commands, write commands, and idle time.

7. The data storage device of claim 1, wherein the controller includes a workload analysis module and an adaptive frequency table.

8. The data storage device of claim 1, wherein the controller is configured to detect a change in workload.

9. The data storage device of claim 1, wherein the controller is configured to monitor impact of clock rate changes.

10. The data storage device of claim 1, wherein the clock rates are based on doorbell rates.

11. The data storage device of claim 10, wherein the clock rates are additionally based on submission queue statistics maintained by the controller.

12. A data storage device, comprising:
a memory device; and
a controller coupled to the memory device, wherein the controller is configured to:
classify a current workload of the data storage device;
determine that the current workload is going to switch to a new workload based upon a rate that a doorbell is rung;
track a number of new available commands in each doorbell and an average command size per submission queue; and
select clock rates based upon the new workload from a stored table.

13. The data storage device of claim 12, wherein the controller is configured to track the rate that the doorbell is rung.

14. The data storage device of claim 12, wherein the controller is configured to predict a pending transfer size for a command in the new workload.

15. A data storage device, comprising:
means to store data; and
a controller coupled to the means to store data, wherein the controller is configured to:
determine that a current workload is going to switch to a new workload based upon a rate that a doorbell is rung;
determine that the new workload of the data storage device is one of: random read, sequential read, random write, sequential write, and mixed workload;
track a number of new available commands in each doorbell and an average command size per submission queue;
obtain clock rates from a table corresponding to the workload; and
set clock rates for a plurality of components of the data storage device,
wherein the set clock rates are the obtained clock rates.

16. The data storage device of claim 15, wherein a clock rate for processors is different from a clock rate for a host interface.

17. The data storage device of claim 15, wherein different workloads have different clock rates for one or more components of the plurality of components.

18. The data storage device of claim 15, wherein the controller is configured to track the rate that the doorbell is rung.

19. The data storage device of claim 15, wherein the controller is configured to predict a pending transfer size for a command in the new workload.

* * * * *